(12) United States Patent
Arima et al.

(10) Patent No.: US 6,996,301 B2
(45) Date of Patent: Feb. 7, 2006

(54) OPTICAL MODULE AND FIBER SHEET

(75) Inventors: Tadao Arima, Kawasaki (JP); Osamu Saito, Kawasaki (JP); Shizuo Ishijima, Kawasaki (JP); Hideaki Miyata, Oyama (JP); Hideaki Terauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 117 days.

(21) Appl. No.: 10/341,429

(22) Filed: Jan. 14, 2003

(65) Prior Publication Data

US 2004/0042754 A1    Mar. 4, 2004

(30) Foreign Application Priority Data

Aug. 27, 2002    (JP)    ............... 2002-247173

(51) Int. Cl.
    *G02B 6/00*    (2006.01)
(52) U.S. Cl. ......................... 385/14; 385/137
(58) Field of Classification Search ................. 385/14, 385/114, 135–137
    See application file for complete search history.

(56) References Cited

U.S. PATENT DOCUMENTS

| | | | |
|---|---|---|---|
| 3,777,154 A * | 12/1973 | Lindsey ................. | 250/227.11 |
| 5,204,925 A * | 4/1993 | Bonanni et al. ............... | 385/89 |
| 5,878,179 A * | 3/1999 | Schricker .................... | 385/100 |
| 5,902,435 A * | 5/1999 | Meis et al. .................. | 156/230 |
| 5,943,455 A * | 8/1999 | Travieso et al. ............. | 385/24 |
| 6,005,991 A * | 12/1999 | Knasel ........................ | 385/14 |
| 6,442,322 B1 * | 8/2002 | Chen et al. .................. | 385/137 |
| 2003/0198427 A1 * | 10/2003 | Bragg et al. .................. | 385/14 |
| 2004/0033005 A1 * | 2/2004 | Arima et al. ................. | 385/14 |
| 2004/0161212 A1 * | 8/2004 | Sun et al. .................... | 385/114 |
| 2004/0213505 A1 * | 10/2004 | Saito et al. ................... | 385/14 |

OTHER PUBLICATIONS

U.S. Appl. No. 60/373,693, filed Apr. 18, 2002.*

* cited by examiner

*Primary Examiner*—Rodney Bovernick
*Assistant Examiner*—Mike Stahl
(74) *Attorney, Agent, or Firm*—Staas & Halsey LLP

(57) ABSTRACT

An optical module including a substrate, a plurality of optical components mounted on the substrate, and a plurality of first optical fibers connected to the optical components. The optical module further includes a fiber sheet including a first resin sheet having an adhesive layer on one side, a plurality of second optical fibers wired on the adhesive layer of the first resin sheet, and a second resin sheet attached to the first resin sheet so that the second optical fibers are sandwiched between the first and second resin sheets. The second optical fibers of the fiber sheet project from between the first and second resin sheets and are connected to the first optical fibers by fusion splicing.

8 Claims, 9 Drawing Sheets

OPTICAL MODULE AND FIBER SHEET

BACKGROUND OF THE INVENTION

1. Field of the Invention

The present invention relates to an optical module and a fiber sheet for use in assembly of the optical module.

2. Description of the Related Art

A fiber sheet having a resin sheet and an optical fiber preliminarily wired on the resin sheet so as to correspond to the connecting relation between optical components is used in an optical module, printed circuit board, or optical transmission apparatus. The present invention relates more particularly to an optical module structure using a fiber sheet for fusion-splice optical fibers between optical components with a short fiber length, thereby eliminating forming of the optical fibers and making the fusion splicing efficient.

In a conventional method of assembling an optical module such as an optical amplifier, optical fibers extending from optical components are routed to connection points and forming of the optical fibers is next performed prior to the fusion splicing. As the number of optical components increases, the routing of optical fibers become more complicated and the connection of optical fibers also becomes more troublesome because of increased connection points and precise position adjustment between optical fibers to be connected. To make the assembly of an optical module efficient, the use of a fiber sheet in the optical module is being considered. The conventional fiber sheet is formed by preparing a first resin sheet having an adhesive layer on one side, bonding an optical fiber through the adhesive layer to the first resin sheet by applying a pressure to thereby wire the optical fiber on the first resin sheet, and attaching a second resin sheet to the first resin sheet so that the optical fiber is sandwiched therebetween. Thus, the adhesive layer is formed on the entire surface of the first resin sheet, so that the optical fiber sandwiched between the first and second resin sheets is fixed.

As mentioned above, in assembling an optical module without the use of a fiber sheet, the routing of optical fibers becomes more complicated and the connection of optical fibers also becomes more troublesome because of increased connection points and precise position adjustment between optical fibers to be connected as the number of optical components increases. Further, the troublesomeness of fiber connection makes it difficult to automate the connection work. On the other hand, in the case of assembling an optical module by using a fiber sheet, an optical fiber extending from the fiber sheet is connected to an optical fiber extending from an optical component. At this time, it is sometimes preferable to reduce the length of each optical fiber from the viewpoints of mounting limitation and workability.

In this case, an extra fiber length due to variations in length of each optical fiber causes a bend and/or stress in the optical fiber at its spliced portion. It is therefore necessary to adjust the extra fiber length. However, in the conventional fiber sheet, the optical fiber is completely fixed between the first and second resin sheets, so that the extra fiber length cannot be adjusted after wiring the optical fiber.

SUMMARY OF THE INVENTION

It is therefore an object of the present invention to provide an optical module which can eliminate the forming of optical fibers extending from optical components and can make the fusion splicing efficient by using a fiber sheet.

It is another object of the present invention to provide a fiber sheet which can adjust an extra fiber length after connection of optical fibers.

In accordance with an aspect of the present invention, there is provided an optical module including a substrate; an optical component mounted on said substrate; a first optical fiber connected to said optical component for inputting/outputting light to/from said optical component; and a fiber sheet including a first resin sheet having an adhesive layer on one side, a second optical fiber wired on said adhesive layer of said first resin sheet, and a second resin sheet attached to said first resin sheet so that said second optical fiber is sandwiched between said first and second resin sheets; said second optical fiber of said fiber sheet projecting from between said first and second resin sheets and being connected to said first optical fiber.

Preferably, said optical module further includes a case for accommodating said substrate and said fiber sheet. Said optical component includes at least one pumping laser diode, and said substrate has a hole at a portion for mounting said laser diode. Said laser diode is inserted in said hole of said substrate and fixed to said case. Preferably, said substrate has a side wall formed with a fiber positioning recess, and said first optical fiber is inserted in said fiber positioning recess and projects from said side wall of said substrate. Preferably, said fiber sheet has a U-shaped configuration so as to surround said substrate, wherein said first optical fiber includes a plurality of optical fibers extending from the opposite ends of said optical component and projecting from the opposite sides of said substrate to be connected to said second optical fiber.

In accordance with another aspect of the present invention, there is provided a fiber sheet including a first resin sheet having an adhesive layer on one side; an optical fiber wired on said adhesive layer of said first resin sheet; and a second resin sheet attached to said first resin sheet so that said optical fiber is sandwiched between said first and second resin sheets; said first resin sheet having a region where no adhesive is applied in the vicinity of the side edge of said first resin sheet, so as to adjust an extra length of said optical fiber.

In accordance with a further aspect of the present invention, there is provided a fiber sheet including a first resin sheet having an adhesive layer on one side; an optical fiber wired on said adhesive layer of said first resin sheet; and a second resin sheet attached to said first resin sheet so that said optical fiber is sandwiched between said first and second resin sheets; said first resin sheet having a hole in the vicinity of the side edge of said first resin sheet, so as to adjust an extra length of said optical fiber.

In accordance with a still further aspect of the present invention, there is provided a fiber sheet including a first resin sheet having a plurality of adhesive spots intermittently applied to one side along a given fiber wiring route; an optical fiber wired on said plurality of adhesive spots of said first resin sheet; and a second resin sheet attached to said first resin sheet so that said optical fiber is sandwiched between said first and second resin sheets.

In accordance with a still further aspect of the present invention, there is provided a fiber sheet including a first resin sheet having an adhesive layer on one side; an optical fiber wired on said adhesive layer of said first resin sheet; a second resin sheet attached to said first resin sheet so that said optical fiber is sandwiched between said first and second resin sheets; and first and second optical fiber terminals projecting from between said first and second resin sheets in different directions intersecting each other; said first optical fiber terminal and said second optical fiber terminal respectively corresponding to one end and the other end of said optical fiber wired between said first and second resin sheets.

In accordance with a still further aspect of the present invention, there is provided a fiber sheet including a first resin sheet having an adhesive layer on one side; a plurality of optical fibers wired on said adhesive layer of said first resin sheet; a second resin sheet attached to said first resin sheet so that said optical fibers are sandwiched between said first and second resin sheets; and a plurality of optical fiber terminals projecting from between said first and second resin sheets toward a closed region; said fiber sheet having a shape surrounding the whole or part of said closed region; said optical fiber terminals respectively corresponding to terminals for inputting/outputting optical signals to/from said optical fibers wired between said first and second resin sheets.

In accordance with a still further aspect of the present invention, there is provided a fiber sheet including a first resin sheet having a first adhesive layer on one side; a first optical fiber wired on said first adhesive layer of said first resin sheet; a second resin sheet attached to said first resin sheet so that said first optical fiber is sandwiched between said first and second resin sheets; a second adhesive layer formed on said second resin sheet; and a second optical fiber wired on said second adhesive layer.

In accordance with a still further aspect of the present invention, there is provided a fiber sheet including a first resin sheet having an adhesive layer on one side; an optical fiber wired on said adhesive layer of said first resin sheet; and a second resin sheet attached to said first resin sheet so that said optical fiber is sandwiched between said first and second resin sheets; said wired optical fiber having a curved portion and a straight portion; at least a part of said curved portion of said optical fiber being not bonded to said first resin sheet; at least a part of said straight portion of said optical fiber being bonded to said first resin sheet.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
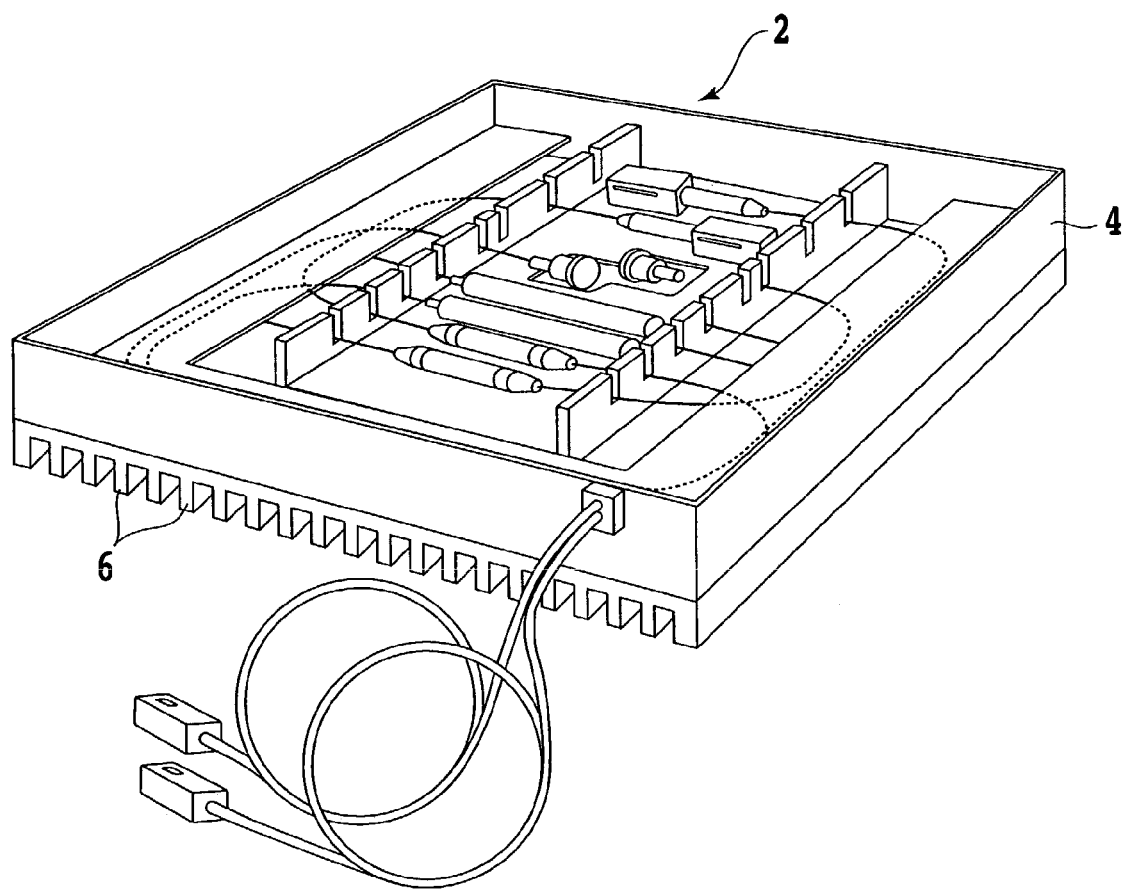
FIG. 1 is a perspective view of an optical module according to a preferred embodiment of the present invention.
Figure 2:
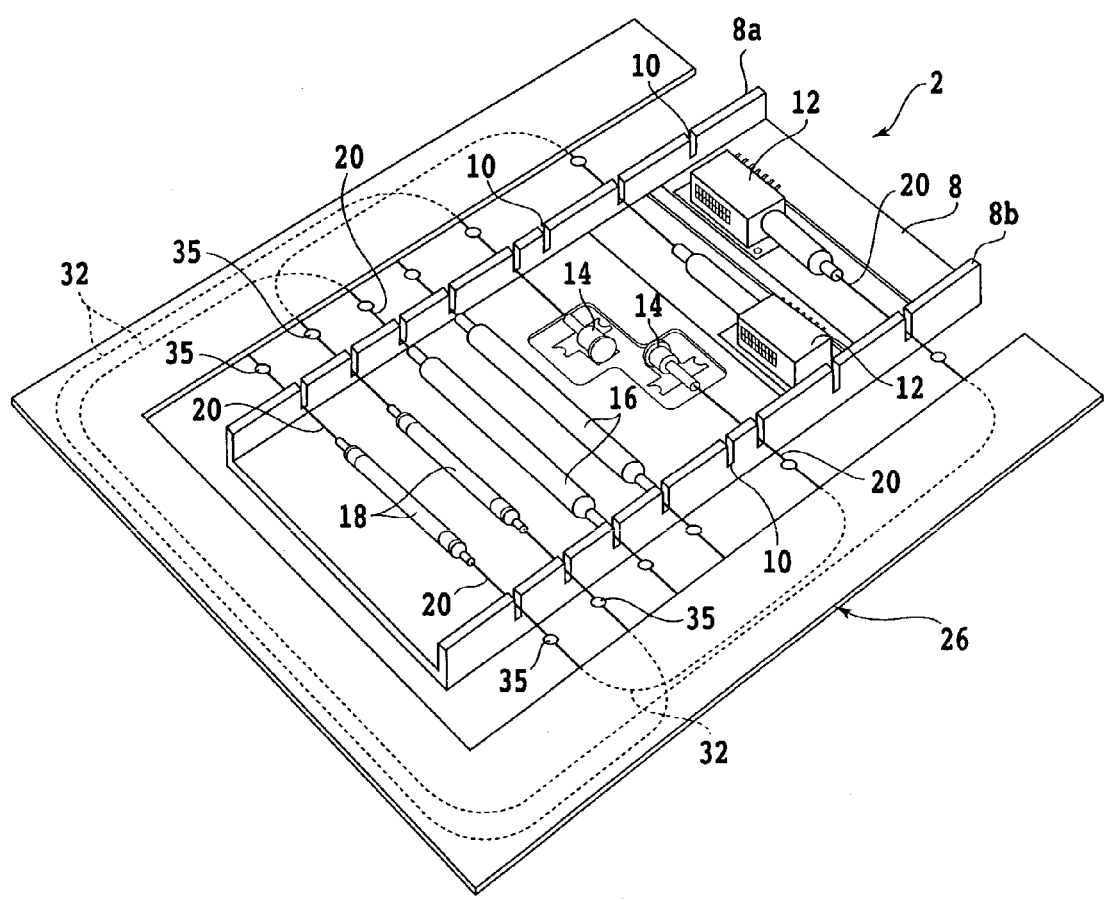
FIG. 2 is a perspective view of the optical module in the condition where a metal case has been removed.

Referring to FIG. 1, there is shown a perspective view of an optical module 2 according to a preferred embodiment of the present invention. FIG. 2 is a perspective view of the optical module 2 in the condition where a metal case 4 shown in FIG. 1 has been removed. As shown in FIG. 1, the optical module 2 is accommodated in the metal case 4 having a plurality of heat radiation fins 6. The metal case 4 is formed of aluminum, for example. Referring to FIG. 2, reference numeral 8 denotes an optical component mounting substrate of the optical module 2. The substrate 8 has a pair of side walls 8a and 8b. Each of the side walls 8a and 8b is formed with a plurality of fiber positioning recesses 10. The substrate 8 is formed of a synthetic resin, for example. Preferably, the bottoms of all the fiber positioning recesses 10 of the side walls 8a and 8b are in substantially the same plane.

A plurality of optical components including pumping laser diodes 12, monitoring photodiodes 14, optical couplers 16, and optical isolators 18 are mounted on the substrate 8. An optical fiber 20 for inputting or outputting an optical signal is connected to one end of each of the laser diodes 12 and the photodiodes 14, and optical fibers 20 are connected to both ends of each of the optical couplers 16 and the optical isolators 18. These optical fibers 20 are inserted in the fiber positioning recesses 10 of the side walls 8a and 8b of the substrate 8 and positioned therein. As mentioned above, the bottoms of the fiber positioning recesses 10 are in substantially the same plane, so that the optical fibers 20 inserted in the fiber positioning recesses 10 and projecting therefrom are aligned as viewed in side elevation.

Figure 3:
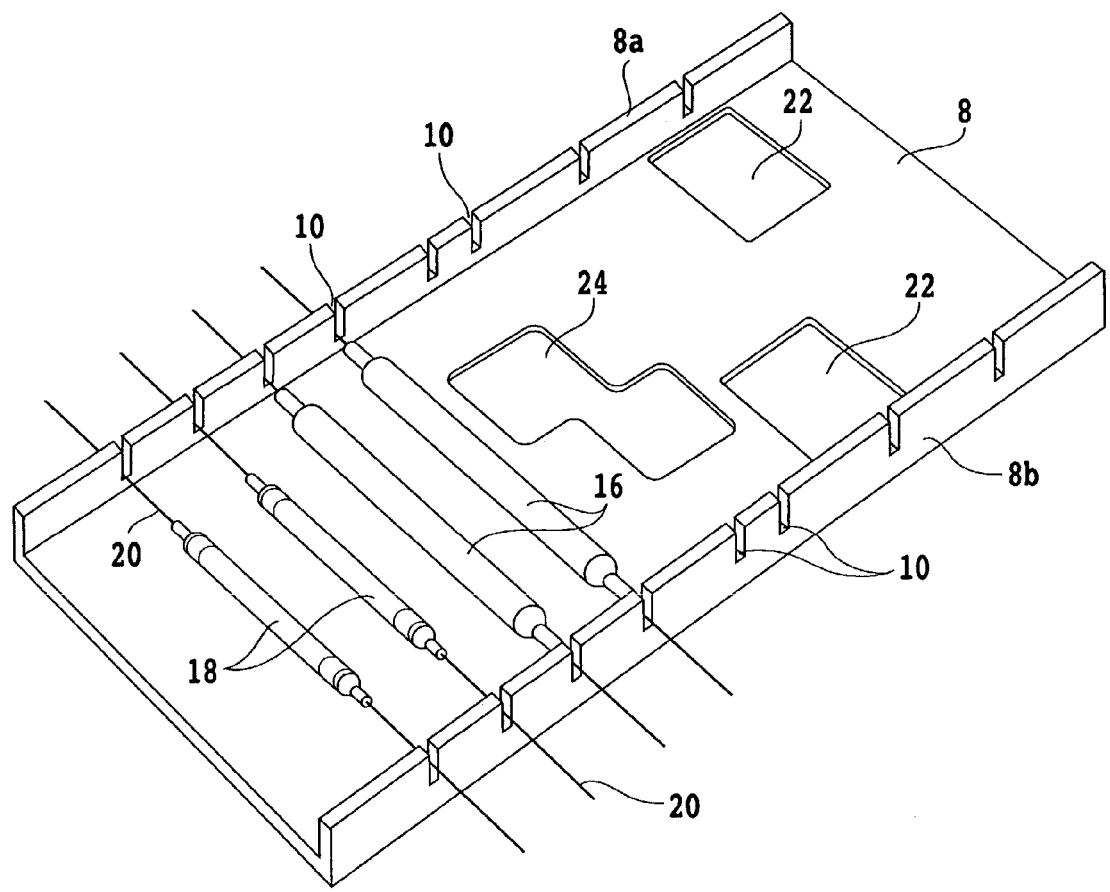
FIG. 3 is a perspective view of an optical component mounting substrate.

As shown in FIG. 3, the substrate 8 is formed with holes 22 as laser diode mounting portions and with a hole 24 as a photodiode mounting portion. The laser diodes 12 are inserted in the holes 22 and fixed by screws to the metal case 4. Similarly, the photodiodes 14 are inserted in the hole 24 and fixed by screws to the metal case 4. The reason for this mounting structure is that the laser diodes 12 are heating components and that heat dissipation therefrom is intended to be improved by directly fixing them to the metal case 4 rather than to the substrate 8 formed of resin which is poor in heat dissipation.

Figure 4:
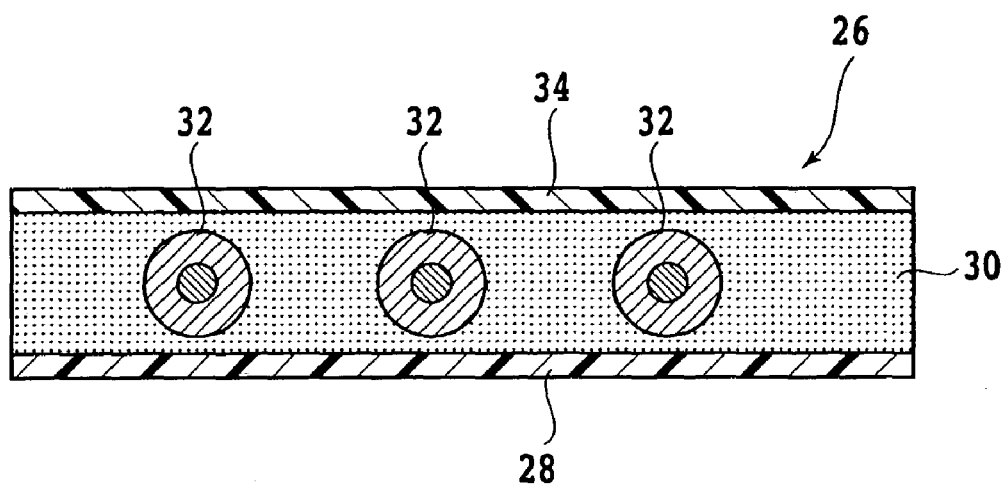
FIG. 4 is a sectional view of a fiber sheet.

Referring back to FIG. 2, reference numeral 26 denotes a U-shaped fiber sheet arranged so as to surround at least two sides of the substrate 8. As shown in FIG. 4, the fiber sheet 26 is composed of a first resin sheet 28 having an adhesive layer 30 on one side, a plurality of optical fibers 32 wired on the adhesive layer 30 of the first resin sheet 28, and a second resin sheet 34 attached to the first resin sheet 28 so that the optical fibers 32 are sandwiched between the first and second resin sheets 28 and 34. Each of the resin sheets 28 and 34 is formed from a polyimide film, for example. The adhesive layer 30 is formed of, for example, rubber elastomer or rosin. The optical fibers 32 are preliminarily wired on the adhesive layer 30 of the first resin sheet 28 so as to correspond to the connecting relation between the optical components 12, 14, 16, and 18.

Figure 5:
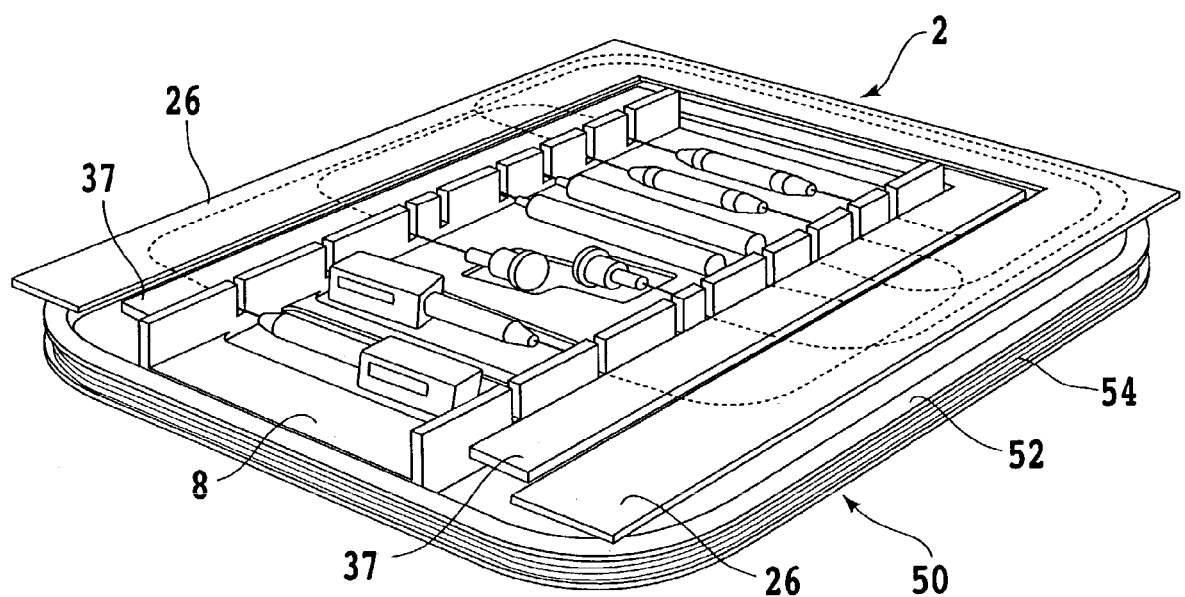
FIG. 5 is a perspective view of the optical module in the condition where protective tapes and an EDF module are added.

The optical fibers 20 connected to the optical components 12, 14, 16, and 18 are inserted in the fiber positioning recesses 10 and project from the side walls 8a and 8b of the substrate 8 by a given length, e.g., about 15 mm. On the other hand, the optical fibers 32 of the fiber sheet 26 project from between the first and second resin sheets 28 and 34 by a given length, e.g., about 15 mm. The projecting portions of each optical fiber 20 and each optical fiber 32 are connected together in the following manner. The coatings of the optical fibers 20 and 32 at their end portions are removed simultaneously by using a jig, and the end faces of the optical fibers 20 and 32 at their bare portions are cut and butt-joined together by fusion splicing. Reference numerals 35 denote fusion-spliced points of the optical fibers 20 and 32 at their end portions. As shown in FIG. 5, the fusion-spliced points 35 arranged in a line along each side of the substrate 8 are sandwiched by protective tapes 37 for the purpose of reinforcement.

Figure 6A:
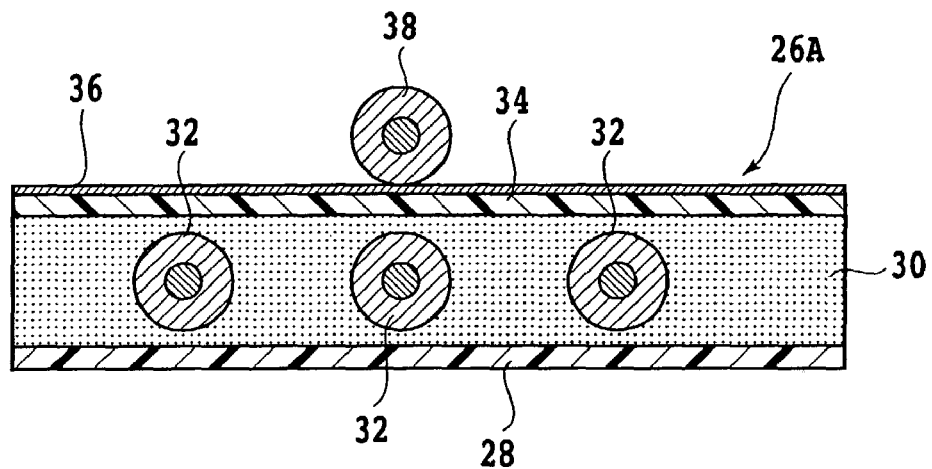
FIG. 6A is a sectional view of a fiber sheet according to another preferred embodiment of the present invention.
Figure 6B:
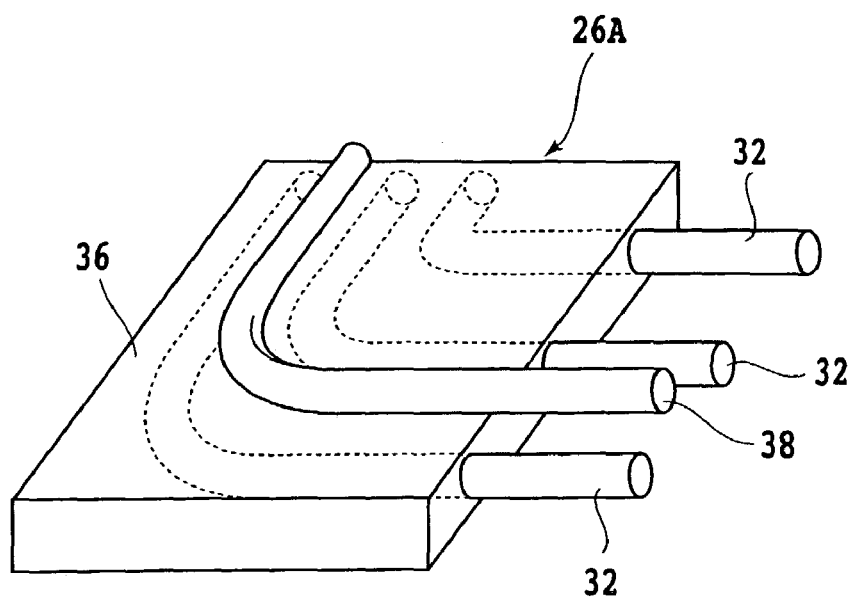
FIG. 6B is a perspective view of the fiber sheet shown in FIG. 6A.

FIG. 6A is a sectional view of a fiber sheet 26A according to another preferred embodiment of the present invention. FIG. 6B is a perspective view of the fiber sheet 26A shown in FIG. 6A. The fiber sheet 26A is different from the fiber sheet 26 in that an additional adhesive layer 36 is formed on the second resin sheet 34 and that an additional optical fiber 38 is wired on the adhesive layer 36. With this structure, it is possible to improve the workability of connection of the optical components to be mounted later and the workability and accommodatability of rewiring of optical fibers at the time of maintenance of the optical module. The vertical position of the optical fiber 38 wired on the upper adhesive layer 36 is substantially the same as that of each optical fiber 32 wired on the lower adhesive layer 30, so that the workability of connection of the optical fiber 38 to the optical fiber 20 of each optical component is substantially the same as that of each optical fiber 32.

Figure 7A:
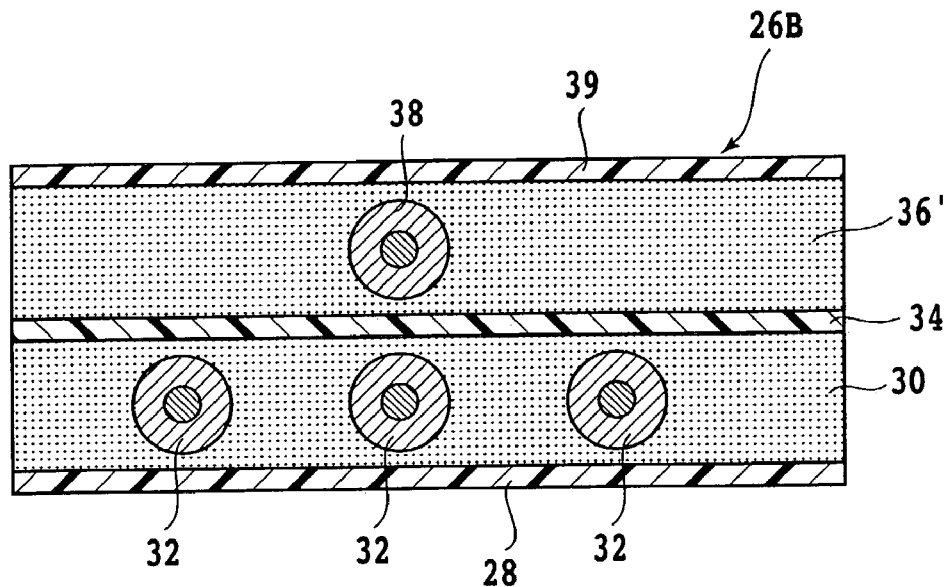
FIG. 7A is a sectional view of a fiber sheet according to a further preferred embodiment of the present invention.
Figure 7B:
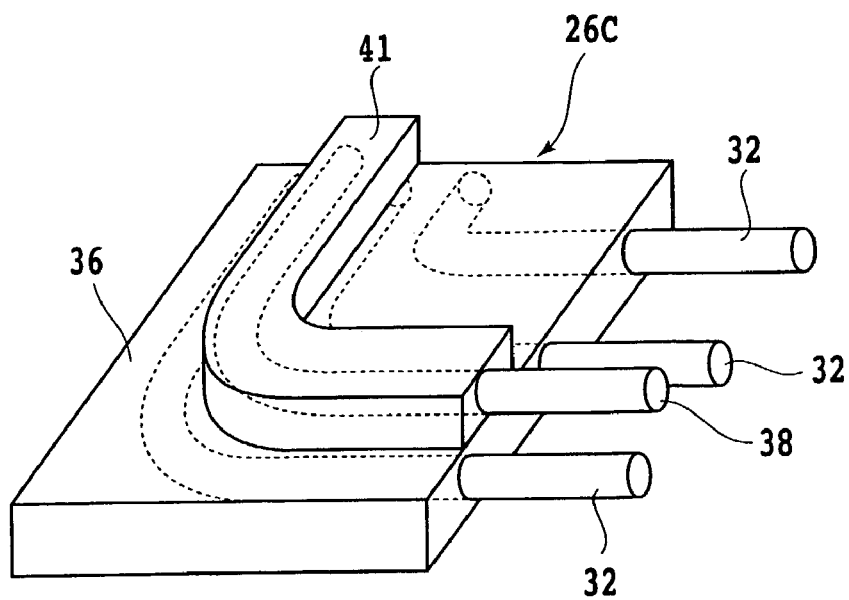
FIG. 7B is a perspective view of a fiber sheet according to a still further preferred embodiment of the present invention.

FIG. 7A is a sectional view of a fiber sheet 26B according to a further preferred embodiment of the present invention. The fiber sheet 26B is different from the fiber sheet 26A in that a thick adhesive layer 36' is formed on the second resin sheet 34 and that a third resin sheet 39 is attached through the adhesive layer 36' to the second resin sheet 34 so that the optical fiber 38 is sandwiched between the second and third resin sheets 34 and 39. FIG. 7B is a perspective view of a fiber sheet 26C according to a still further preferred embodiment of the present invention. The fiber sheet 26C is different from the fiber sheet 26A in that a third resin sheet 41 is attached through the adhesive layer 36 to the second resin sheet 34 so that the optical fiber 38 is sandwiched between the second and third resin sheets 34 and 41. As mentioned above, the optical fibers 20 extending from the optical components 12 to 18 are fusion-spliced to the optical fibers 32 extending from the fiber sheet 26, so that connection loss can be reduced and size reduction is allowed as compared with the connection using connectors in the prior art.

Figure 8:
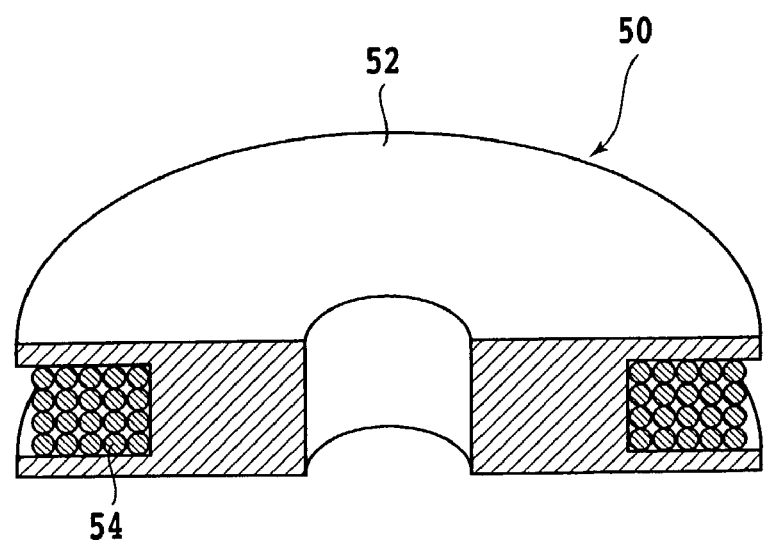
FIG. 8 is a partially cutaway, perspective view of the EDF module.

Referring again to FIG. 5, an Er doped optical fiber module (EDF module) 50 is arranged below the fiber sheet 26. Although not shown, input and output optical fibers for the EDF module 50 are wired on the adhesive layer 30 of the fiber sheet 26. As shown in FIG. 8, the EDF module 50 is configured by winding an Er doped optical fiber 54 around a reel 52.

Figure 9:
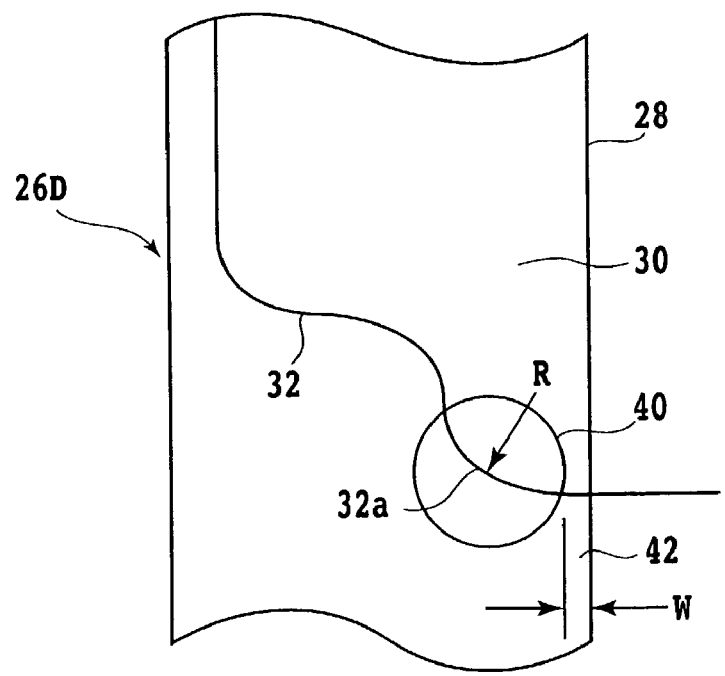
FIG. 9 is a schematic plan view showing a first preferred embodiment of an extra fiber length adjusting structure according to the present invention.

As mentioned above, the optical fibers 20 extending from the optical components 12 to 18 and the optical fibers 32 extending from the fiber sheet 26 are connected by fusion splicing in the condition that the length of the projecting portion of each optical fiber 20 from the substrate 8 is set to about 15 mm and that the length of the projecting portion of each optical fiber 32 is also set to about 15 mm. At the time of this fusion splicing, extra fiber length variations of about ±0.5 mm occur. There will now be some preferred embodiments of the fiber sheet structure for absorbing the above extra fiber length variations. FIG. 9 shows a first preferred embodiment of the extra fiber length adjusting structure according to the present invention. Reference numeral 26D denotes a fiber sheet having the first preferred embodiment of the extra fiber length adjusting structure. In contrast to the fiber sheet 26, the fiber sheet 26D is characterized in that the first resin sheet 28 has a region 40 where no adhesive is applied in the vicinity of the side edge of the fiber sheet 26D from which the optical fiber 32 projects.

That is, the adhesive layer 30 is formed on the first resin sheet 28 except this region 40. The optical fiber 32 is wired so as to form a curved portion 32a having a radius of curvature R of 33 mm in this region 40. In other words, the optical fiber 32 is wired on the adhesive layer 30 so that a portion of the optical fiber 32 in the region 40 does not become straight. Between the region 40 and the side edge of the fiber sheet 26D, there is a portion 42 of the adhesive layer 28 where the optical fiber 32 is bonded. This fiber bonded portion 42 has a width W of about 5 mm, for example.

It is assumed that extra fiber length variations of about ±0.5 mm occur after completion of the fusion splicing of all the optical fibers 20 extending from the optical components 12 to 18 and all the optical fibers 32 extending from the fiber sheet 26D. In this condition, stress is produced near the fusion-spliced points between the optical fibers 20 and the optical fibers 32, causing an increase in loss. To cope with this problem, the fiber about 90° C. by using a heater to weaken the adhesive force of the adhesive layer 30, thereby relieving the stress to move the optical fiber 32. Accordingly, a bend in the optical fiber 32 caused by the extra fiber length variations can be eliminated.

Even in the case that the fusion splicing is not successful, the optical fiber 32 can be drawn from the fiber sheet 26D to some extent owing to the region 40 where no adhesive is applied, and the fusion splicing of the optical fiber 20 and the optical fiber 32 can be made again. The region 40 may be formed by preliminarily attaching a dummy sheet to an intended portion of the first resin sheet 28, next applying the adhesive to the entire surface of the first resin sheet 28, and finally removing the dummy sheet.

Figure 10:
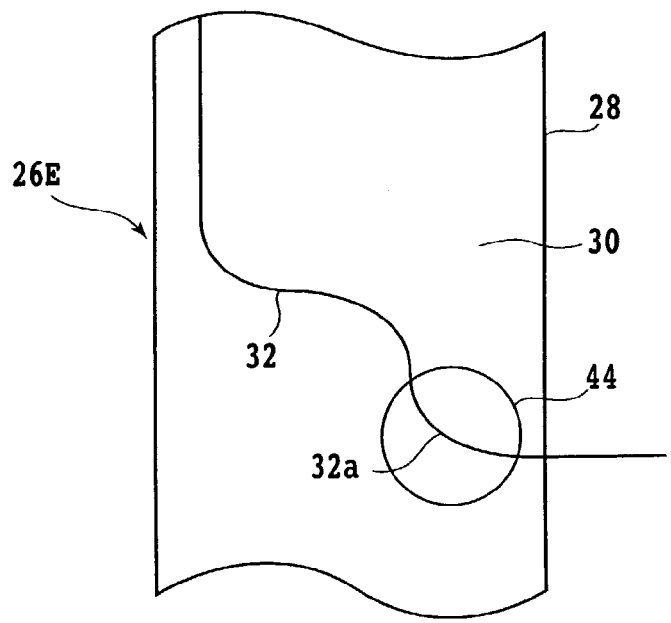
FIG. 10 is a schematic plan view showing a second preferred embodiment of the extra fiber length adjusting structure.

Referring to FIG. 10, there is shown a second preferred embodiment of the extra fiber length adjusting structure according to the present invention. Reference numeral 26E denotes a fiber sheet having the second preferred embodiment of the extra fiber length adjusting structure. In contrast to the fiber sheet 26, the fiber sheet 26E is characterized in that the first resin sheet 28 has a hole 44 in the vicinity of the side edge of the fiber sheet 26E from which the optical fiber 32 projects. Like the first preferred embodiment shown in FIG. 9, the optical fiber 32 is wired so as to form a curved portion 32a in the hole 44. Also according to this preferred embodiment, extra fiber length variations can be absorbed as in the first preferred embodiment.

Figure 11:
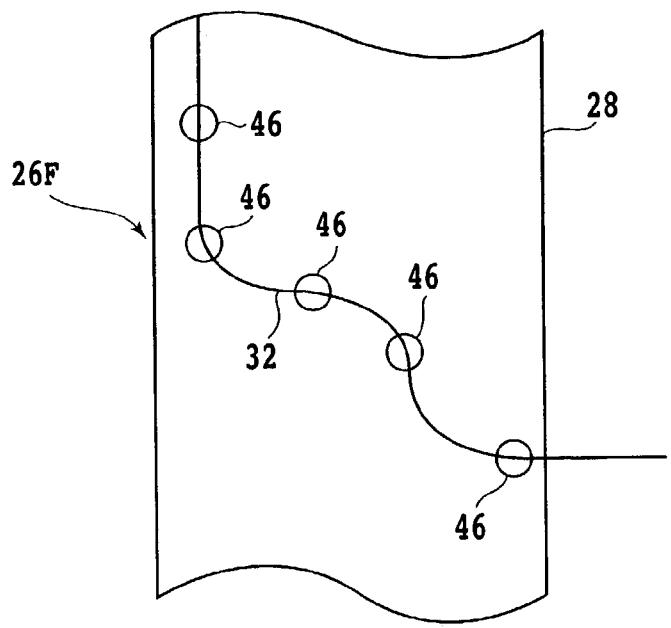
FIG. 11 is a schematic plan view showing a third preferred embodiment of the extra fiber length adjusting structure.

FIG. 11 shows a third preferred embodiment of the extra fiber length adjusting structure according to the present invention. Reference numeral 26F denotes a fiber sheet having the third preferred embodiment of the extra fiber length adjusting structure. In contrast to the fiber sheet 26, the fiber sheet 26F is characterized in that the adhesive is intermittently applied to the first resin sheet 28 to form a plurality of adhesive spots 46 and that the optical fiber 32 is wired on the adhesive spots 46. Also according to this preferred embodiment, extra fiber length variations can be absorbed to thereby eliminate a bend in the optical fiber 32 as in the first and second preferred embodiments.

According to the optical module of the present invention as described above, routing of the optical fibers is not required and positioning of the optical fibers can be easily performed. Accordingly, automated fusion splicing of the plural optical fibers can be achieved. Furthermore, connection loss of the optical fibers can be reduced as compared with the fiber connection using a connector, so that a degradation in characteristics can be eliminated and a size reduction in the optical module can be achieved. Furthermore, the fiber sheet according to the present invention has a structure for absorbing extra fiber length variations of the optical fibers, so that the stress produced in each optical fiber due to the extra fiber length variations can be eliminated to thereby improve the reliability of the fusion-spliced portions of the optical fibers.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical module comprising:
   a substrate;
   an optical component mounted on said substrate;
   a first optical fiber connected to said optical component for inputting/outputting light to/from said optical component;
   a fiber sheet including a first resin sheet having an adhesive layer on one side, a second optical fiber wired on said adhesive layer of said first resin sheet, and a second resin sheet attached to said first resin sheet so that said second optical fiber is sandwiched between said first and second resin sheets; and
   a metal case accommodating said substrate and said fiber sheet;
   said second optical fiber of said fiber sheet projecting from between said first and second resin sheets and being connected to said first optical fiber,
   said optical component including at least one pumping laser diode,
   said substrate having a hole through a portion of the substrate, and
   said laser diode being insertable through said hole of said substrate and fixed to said metal case,
   wherein heat generated from said pumping laser diode is dissipated through said metal case.

2. An optical module, comprising:
   a substrate;
   an optical component mounted on said substrate;
   a first optical fiber connected to said optical component for inputting/outputting light to/from said optical component;
   a fiber sheet including a first resin sheet having an adhesive layer on one side, a second optical fiber wired on said adhesive layer of said first resin sheet, and a second resin sheet attached to said first resin sheet so that said second optical fiber is sandwiched between said first and second resin sheets,
   said second optical fiber of said fiber sheet projecting from between said first and second resin sheets and being connected to said first optical fiber,
   wherein said substrate has a side wall formed with a fiber positioning recess;
   said first optical fiber being inserted in said fiber positioning recess and projecting from said side wall of said substrate.

3. An optical module comprising,
   a substrate;
   an optical component mounted on said substrate;
   a first optical fiber connected to said optical component for inputting/outputting light to/from said optical component;
   a fiber sheet including a first resin sheet having an adhesive layer on one side, a second optical fiber wired on said adhesive layer of said first resin sheet, and a second resin sheet attached to said first resin sheet so that said second optical fiber is sandwiched between said first and second resin sheets,
   wherein said fiber sheet has a U-shaped configuration so as to surround said substrate;
   said first optical fiber comprising a plurality of optical fibers extending from the opposite ends of said optical component and projecting from the opposite sides of said substrate to be connected to said second optical fiber.

4. An optical module according to claim 1, wherein said first resin sheet of said fiber sheet has a region where no adhesive is applied in the vicinity of the side edge of said first resin sheet;
   said region being set according to a given wiring route of said second optical fiber, thereby adjusting an extra length of said second optical fiber.

5. An optical module comprising,
   a substrate;
   an optical component mounted on said substrate;
   a first optical fiber connected to said optical component for inputting/outputting light to/from said optical component;
   a fiber sheet including a first resin sheet having an adhesive layer on one side, a second optical fiber wired on said adhesive layer of said first resin sheet, and a second resin sheet attached to said first resin sheet so that said second optical fiber is sandwiched between said first and second resin sheets;
   said second optical fiber of said fiber sheet projecting from between said first and second resin sheets and being connected to said first optical fiber,
   wherein said first resin sheet of said fiber sheet has a hole in the vicinity of the side edge of said first resin sheet;
   said hole being set according to a given wiring route of said second optical fiber, thereby adjusting an extra length of said second optical fiber.

6. An optical module according to claim 1, wherein said fiber sheet further includes a second adhesive layer formed on at least one of said first resin sheet and said second resin sheet.

7. A fiber sheet comprising:
   a first resin sheet having an adhesive layer formed uniformly on one side thereof except for a region where no adhesive is applied in the vicinity of the side edge of said first resin sheet;
   an optical fiber wired on said adhesive layer of said first resin sheet; and a second resin sheet attached to said first resin sheet so that said optical fiber is sandwiched between said first and second resin sheets;

said first resin sheet having the region where no adhesive is applied in the vicinity of the side edge of said first resin sheet, so as to adjust an extra length of said optical fiber.

8. A fiber sheet comprising:

a substantially U-shaped first resin sheet having an adhesive layer on one side;

a plurality of optical fibers wired on said adhesive layer of said first resin sheet;

a second resin sheet having a same shape as that of said first resin sheet, said second resin sheet being attached to said first resin sheet so that said optical fibers are sandwiched between said first and second resin sheets; and a plurality of optical fiber terminals projecting from inner edges of said first and second resin sheets;

said optical fiber terminals respectively corresponding to terminals for inputting/outputting optical signals to/from said optical fibers wired between said first and second resin sheets.

* * * * *

UNITED STATES PATENT AND TRADEMARK OFFICE
CERTIFICATE OF CORRECTION

| | | |
|---|---|---|
| PATENT NO. | : 6,996,301 B2 | |
| APPLICATION NO. | : 10/341429 | |
| DATED | : February 7, 2006 | |
| INVENTOR(S) | : Tadao Arima et al. | |

It is certified that error appears in the above-identified patent and that said Letters Patent is hereby corrected as shown below:

On the Title Page, Column 2, line 10, U.S. PATENT DOCUMENTS, replace "385/14" with --385/014--, therefor;

On the Title Page, Column 2, line 1, OTHER PUBLICATIONS, after "U.S.", insert --Provisional--;

Column 7, line 67, Claim 2, replace "sheets," with --sheets;--, therefor;

Column 8, line 14, Claim 3, after "component", insert --and--.

Signed and Sealed this

First Day of August, 2006

JON W. DUDAS
*Director of the United States Patent and Trademark Office*